United States Patent
Twork et al.

(10) Patent No.: US 9,713,997 B2
(45) Date of Patent: Jul. 25, 2017

(54) INTERIOR PANELS INCLUDING SUBSTRATES WITH FILM INSERTS FOR DEFINING INTEGRATED AIRBAG DEPLOYMENT DOORS FOR MOTOR VEHICLES AND METHODS OF MAKING THE SAME

(71) Applicant: Faurecia Interior Systems, Inc., Auburn Hills, MI (US)

(72) Inventors: Michael J. Twork, White Lake, MI (US); Bradley P. Kusky, Swartz Creek, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 0 days.

(21) Appl. No.: 14/812,345

(22) Filed: Jul. 29, 2015

(65) Prior Publication Data
US 2017/0028959 A1 Feb. 2, 2017

(51) Int. Cl.
*B60R 21/216* (2011.01)
*B60R 21/2165* (2011.01)
*B29C 45/00* (2006.01)
*B29C 45/14* (2006.01)
*B29L 31/30* (2006.01)

(52) U.S. Cl.
CPC ...... *B60R 21/2165* (2013.01); *B29C 45/0081* (2013.01); *B29C 45/14795* (2013.01); *B29C 45/14065* (2013.01); *B29C 45/14344* (2013.01); *B29C 2045/14131* (2013.01); *B29L 2031/3038* (2013.01)

(58) Field of Classification Search
CPC ............ B60R 21/2165; B29C 45/0081; B29C 45/14065; B29L 2031/3038; B29K 2105/20
See application file for complete search history.

(56) References Cited

U.S. PATENT DOCUMENTS

| | | | | |
|---|---|---|---|---|
| 5,219,177 A | * | 6/1993 | Wang | B60R 21/215 280/728.3 |
| 5,256,354 A | * | 10/1993 | Chadwick | B29C 37/0057 264/119 |
| 5,382,047 A | * | 1/1995 | Gajewski | B60R 21/2165 280/728.3 |

(Continued)

FOREIGN PATENT DOCUMENTS

| KR | 20030010918 A | 2/2003 |
|---|---|---|
| KR | 20100134473 A | 12/2010 |

OTHER PUBLICATIONS

United States Patent Office, U.S. Appl. No. 14/695,679, filed Apr. 24, 2015.

(Continued)

*Primary Examiner* — Darlene P Condra
(74) *Attorney, Agent, or Firm* — Lorenz & Kopf LLP

(57) ABSTRACT

Interior panels having integrated airbag deployment doors for motor vehicles and methods for making such interior panels are provided. In one example, an interior panel for a motor vehicle includes a substrate. The substrate includes a substrate section and a film insert. The film insert is disposed in the substrate section such that a frangible tear seam is formed along an interface between the film insert and the substrate section defining an integrated airbag deployment door in the substrate.

15 Claims, 7 Drawing Sheets

(56) References Cited

U.S. PATENT DOCUMENTS

| | | | |
|---|---|---|---|
| 5,429,784 A * | 7/1995 | Iannazzi | B29C 37/0057 |
| | | | 264/126 |
| 5,458,361 A | 10/1995 | Gajewski | |
| 5,530,057 A * | 6/1996 | Humphrey | C08K 3/0033 |
| | | | 523/218 |
| 5,533,748 A * | 7/1996 | Wirt | B29C 37/0057 |
| | | | 280/728.3 |
| 5,567,375 A * | 10/1996 | Filion | B29C 37/0057 |
| | | | 264/177.17 |
| 5,744,776 A | 4/1998 | Bauer | |
| 6,042,139 A | 3/2000 | Knox | |
| 6,872,349 B2 | 3/2005 | Hier et al. | |
| 7,160,404 B2 | 1/2007 | Cowelchuk et al. | |
| 7,291,301 B2 | 11/2007 | Cowelchuk et al. | |
| 7,434,829 B2 | 10/2008 | Cvengros | |
| 7,556,284 B2 | 7/2009 | Riha et al. | |
| 7,926,842 B2 | 4/2011 | Kong | |
| 8,336,907 B2 | 12/2012 | Nogaret et al. | |
| 2004/0043683 A1 | 3/2004 | Muench | |
| 2006/0079144 A1 | 4/2006 | Klisch et al. | |
| 2007/0013172 A1 | 1/2007 | Haba et al. | |
| 2007/0101671 A1 * | 5/2007 | Deeks | B29C 39/10 |
| | | | 52/578 |
| 2009/0278337 A1 | 11/2009 | Springer et al. | |
| 2009/0288542 A1 | 11/2009 | Matsuno | |
| 2010/0279051 A1 * | 11/2010 | Pokorzynski | B29C 43/18 |
| | | | 428/43 |
| 2011/0278827 A1 | 11/2011 | Laboeck et al. | |
| 2012/0038133 A1 * | 2/2012 | Kalisz | B29C 33/42 |
| | | | 280/728.3 |
| 2012/0068441 A1 | 3/2012 | Kalisz | |
| 2013/0249195 A1 | 9/2013 | Hagl | |
| 2013/0270801 A1 * | 10/2013 | Zhang | B60R 21/2165 |
| | | | 280/728.3 |
| 2016/0257839 A1 * | 9/2016 | Brooks | C09D 133/12 |

OTHER PUBLICATIONS

Non-Final Office Action, U.S. Appl. No. 14/695,679, Issued Jul. 5, 2016.

Final Office Action, U.S. Appl. No. 14/695,679, Issued Jan. 13, 2017.

* cited by examiner

INTERIOR PANELS INCLUDING SUBSTRATES WITH FILM INSERTS FOR DEFINING INTEGRATED AIRBAG DEPLOYMENT DOORS FOR MOTOR VEHICLES AND METHODS OF MAKING THE SAME

TECHNICAL FIELD

The present disclosure relates generally to interior panels for motor vehicles, and more particularly relates to interior panels having integrated airbag deployment doors for motor vehicles and methods for making such interior panels.

BACKGROUND

Motor vehicles often include an inflatable restraint apparatus having a deployable airbag positioned in or behind an interior vehicle panel, such as an instrument panel, door panel, and the like. Many interior panels include an integrated deployment door formed into the interior panel that is designed to break free upon deployment of the airbag. Controlling the opening of the deployment door is desirable for providing a clean deployment, e.g., minimal or no fragmentation, of the airbag through the interior panel. Often an area of the interior panel surrounding the deployment door is scored or pre-weakened, e.g., via laser scoring, mechanical scoring, or the like to form a seam that facilitates a clean airbag deployment.

In one example disclosed in U.S. Pat. No. 5,744,776, issued to Bauer, a pre-weakening internal groove is formed in an automotive trim piece after the automotive trim piece has been molded or otherwise formed. In particular, an automotive trim piece is formed, for example, by injection molding a polymeric material to form an automotive trim piece cover layer. The automotive trim piece cover layer is then mounted on a fixture and a laser beam impinges the inside surface of the cover layer to form a groove that defines a pre-weakening pattern which functions as an integrated airbag deployment door. A robot arm may be used to move a laser generator so as to form the pre-weakening pattern. Unfortunately, such secondary operations that include, for example, laser generators, robots, and/or fixtures for forming a pre-weakening pattern in an automotive trim piece after molding or otherwise after forming of the automotive trim piece are relatively expensive and can include significant investment and/or operating costs.

Accordingly, it is desirable to provide interior panels having integrated airbag deployment doors for motor vehicles with improved manufacturing efficiencies and/or lower manufacturing costs and methods for making such interior panels. Furthermore, other desirable features and characteristics of the present disclosure will become apparent from the subsequent detailed description and the appended claims, taken in conjunction with the accompanying drawings and this background.

BRIEF SUMMARY

Interior panels having integrated airbag deployment doors for motor vehicles and methods for making such interior panels are provided herein. In an exemplary embodiment, an interior panel for a motor vehicle includes a substrate. The substrate includes a substrate section and a film insert. The film insert is disposed in the substrate section such that a frangible tear seam is formed along an interface between the film insert and the substrate section defining an integrated airbag deployment door in the substrate.

In an exemplary embodiment, a method for making an interior panel for a motor vehicle is provided herein. The method includes the steps of providing a film insert. A substrate is insert molded including positioning the film insert in a molding tool. A molten plastic material is advanced and solidified in the molding tool to form a substrate section about the film insert such that an insert quasi-knit line is formed along an interface between the film insert and the substrate section. At least a portion of the insert quasi-knit line defines a frangible tear seam that defines an integrated airbag deployment door in the substrate.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
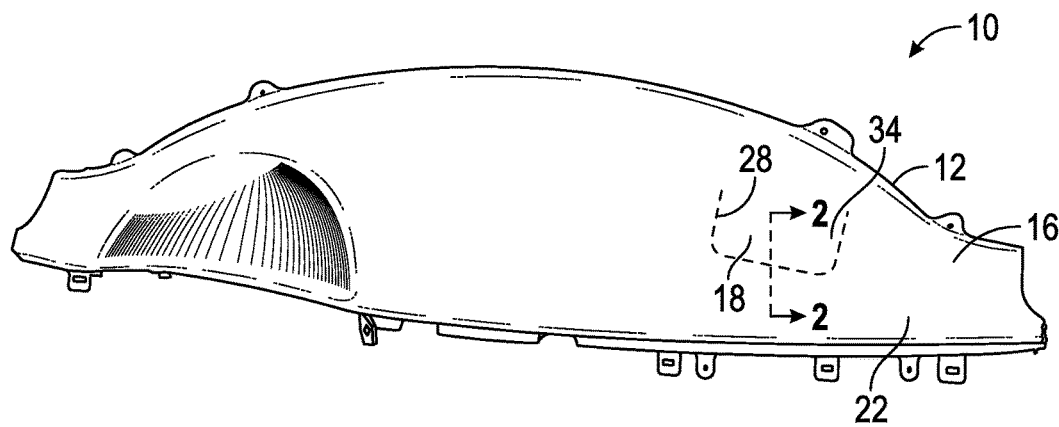
FIG. 1 is a perspective view of an interior panel for a motor vehicle in accordance with an exemplary embodiment.

The following Detailed Description is merely exemplary in nature and is not intended to limit the disclosure or the application and uses of the disclosure. Furthermore, there is no intention to be bound by any theory presented in the preceding background or the following detailed description.

Various embodiments contemplated herein relate to interior panels having integrated airbag deployment doors for motor vehicles and methods for making such interior panels. The exemplary embodiments taught herein provide an interior panel that includes a substrate. The substrate includes a substrate section and a film insert. The film insert is disposed in the substrate section such that a frangible tear seam is formed along an interface between the film insert and the substrate section defining an integrated airbag deployment door in the substrate.

In an exemplary embodiment, the substrate is produced via an insert molding process. In one example, the film insert is formed of a die cut plastic film material and has at least a portion that is elongated, extending longitudinally to define an outer perimeter of a "door flap-shaped" pattern (e.g., a "U-shaped" pattern or alternatively an "H-shaped" pattern). The film insert is positioned in a molding tool. The molding tool has matched molding tool portions that define a molding tool cavity when the matched molding tool portions are positioned in a "closed mold" configuration. During the insert molding process, polymeric resin (e.g., plastic material) is heated to form a molten plastic material that is advanced in a fluidized state in the molding tool cavity including over, on, and/or about the film insert. In an exemplary embodiment, when the molten plastic material contacts the film insert, a quasi-knit line (hereinafter "insert quasi-knit line") is formed at the interface between the molten plastic material and the film insert. An insert quasi-knit line is herein understood to mean a weakening line that is formed when a molten plastic material flow front contacts and partially solidifies on contact with a solid and typically cooler film insert material. The molten plastic material is solidified via cooling in the molding tool to form the substrate section that is disposed about the film insert. The substrate is then removed from the molding tool. In an exemplary embodiment, a portion of the insert quasi-knit line that is formed along an outer film surface of the film insert forms the frangible tear seam.

In an exemplary embodiment, the substrate may be used "as is" or may be further decorated for use as an interior panel for a motor vehicle in which the frangible tear seam defines the integrated airbag deployment door. In an exemplary embodiment, the frangible tear seam is configured to rupture, for example, during an airbag deployment to allow the integrated airbag deployment door to open, thereby forming an opening in the substrate to allow an airbag to deploy through the substrate. Advantageously, in an exemplary embodiment, by using a film insert to form an insert quasi-knit line that defines a frangible tear seam during the insert molding fabrication stage of the substrate, subsequent secondary operations for forming a pre-weakening pattern in the substrate are not needed thereby improving manufacturing efficiencies and/or reducing manufacturing costs.

Figure 2:
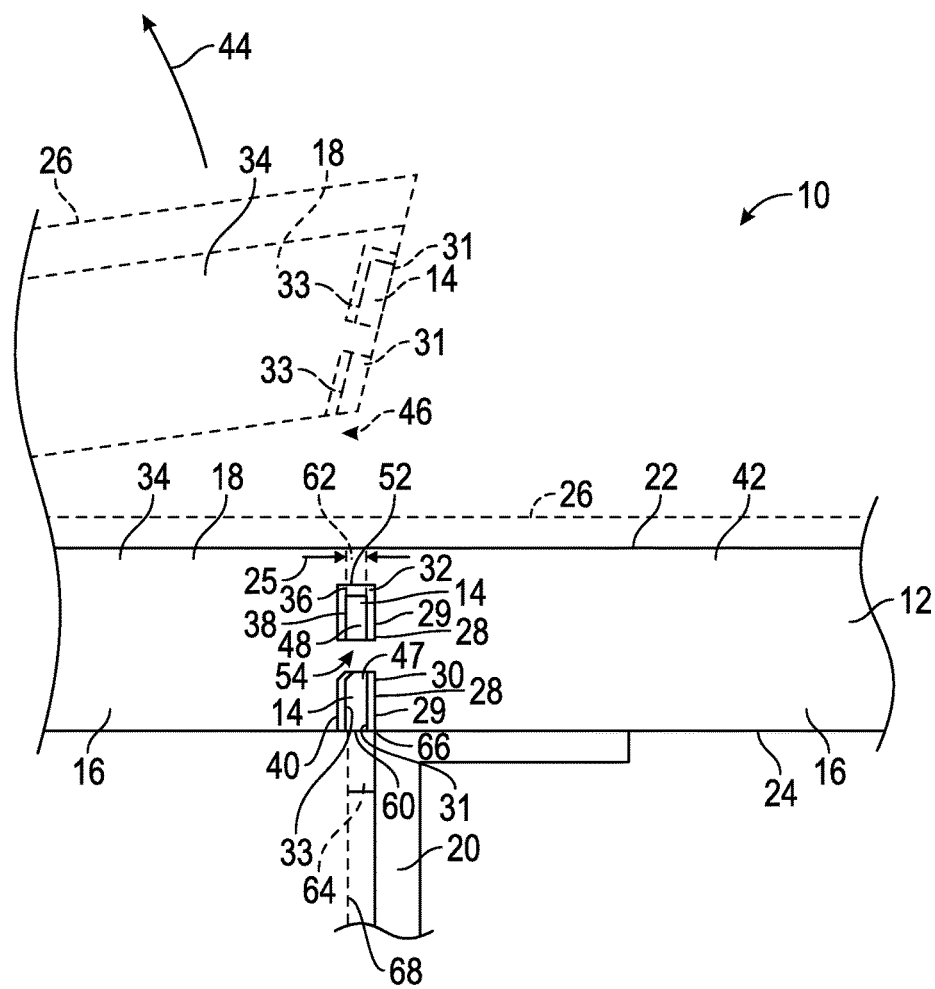
FIG. 2 is a sectional view of the interior panel depicted in FIG. 1 along line 2-2.

FIG. 1 is a perspective view of an interior panel 10 for a motor vehicle in accordance with an exemplary embodiment. FIG. 2 is a sectional view of the interior panel 10 depicted in FIG. 1 along line 2-2. In an exemplary embodiment, the interior panel 10 is an instrument panel that can be positioned forward of a driver seat and a front passenger seat of a motor vehicle. As such, FIG. 2 depicts a view of the interior panel 10 forward of the front passenger seat. Alternatively, the interior panel 10 can be a door panel or other interior vehicle trim panel.

As illustrated, the interior panel 10 comprises a substrate 12. The substrate 12 includes a film insert 14 and a substrate section 16 that is disposed about the film insert 14. In an exemplary embodiment, the substrate section 16 includes an integrated airbag deployment door 18. A chute 20 is operatively coupled to the substrate 12 and is for receiving an airbag module (not shown) and to direct a deployable airbag (not shown) from the airbag module towards the integrated airbag deployment door 18 during airbag deployment. In one example, the substrate 12 has an outer surface 22 that faces towards the interior of the motor vehicle and an inner surface 24 that faces away from the interior of the motor vehicle, and the chute 20 is directly coupled (e.g., vibration welded or the like) to the inner surface 24 of the substrate 12.

In an exemplary embodiment, the substrate section 16 may be formed of a plastic material, such as, for example, polypropylene (PP) and/or thermoplastic olefin (TPO), styrene maleic anhydride (SMA), polycarbonate (PC), ABS, PC/ABS, or any other substrate material for vehicle interior applications known to those skilled in the art. The plastic material may include one or more other ingredients, such as rubber, fillers such as talc and the like, impact modifiers, stabilizers, processing additives and/or mold release agents, reinforcing fibers such as glass fibers, natural fibers, and the like, anti-scratch additives, pigments and/or molded-in-color additives, adhesion promoters, recycled product, and the like. The chute 20 may be formed of a polymeric material such as thermoplastic elastomer (TPE), TPO, PP, and/or the like.

In an exemplary embodiment, the film insert 14 may be formed of a plastic film material (e.g., plastic material that has been shaped into a film via an extrusion process, a calendaring process, or other film forming process), such as, for example, polyethylene, polyamide (e.g., nylon®), polyester (e.g., polyethylene terephthalate (PET)), polycarbonate (PC), polytetrafluoroethylene (PTFE), or the like. In an exemplary embodiment, the plastic film material has a higher melting temperature than the melting temperature of the plastic material that forms the substrate section 16. In one example, the plastic material of the substrate section 16 has a melting temperature of from about 100 to about 150° C. and the plastic film material has a melting temperature of from about 160 to about 350° C. Advantageously, in an exemplary embodiment, the plastic film material having a higher melting temperature than the plastic material of the substrate section 16 facilitates the film insert 14 maintaining a predetermined shaped during formation of the substrate 12 (e.g., via an insert molding process or the like). In an exemplary embodiment, the plastic film material has a lower surface free energy than the plastic material of the substrate section 16. In one example, the plastic material of the substrate section 16 has a surface free energy of about 25 to about 40 mN/m (at 20° C.) and the plastic film material has a surface free energy of about 15 to about 25, such as about 17 to about 23 mN/m (at 20° C.), for example about 20 mN/m (at 20° C.) In an exemplary embodiment, the plastic film material is PTFE (e.g., a Teflon® film insert). Advantageously, in an exemplary embodiment, the plastic film material having a lower surface free energy than the plastic material of the substrate section 16 helps reduce adhesion between the substrate section 16 and the plastic film material to facilitate the integrated airbag deployment door 18 cleanly opening (e.g., with minimal or no fragmentation) during airbag deployment as will be discussed in further detail below. In an exemplary embodiment, the film insert 14 has a thickness (indicated by arrows 25) of from about 0.01 to about 1 mm for example about 0.05 to about 0.5 mm.

The outer surface 22 of the substrate 12 can be a hard decorative surface, such as a mold-in-color surface, a painted surface, or the like. Alternatively, the outer surface 22 of the substrate 12 can be covered with a covering 26 such as skin and foam, such as in well-known foam-in-place or tri-laminate constructions, to provide a "soft instrument panel," or as a "wrapped panel" in which the covering 26 may be leather, vinyl, a bi-laminate construction, or the like.

As illustrated, the film insert 14 is disposed in the substrate section 16 and a frangible tear seam 28 is formed along interfaces 30 and 32 between the film insert 14 and the substrate section 16 defining the integrated airbag deployment door 18. In an exemplary embodiment, the integrated airbag deployment door 18 comprises at least a portion of the film insert 14 and an inboard portion 34 of the substrate section 16 that is disposed laterally adjacent to the film insert 14.

Referring to FIG. 2 and as will be discussed in further detail below, in an exemplary embodiment, an insert quasi-knit line 29 is formed along the interfaces 30, 32, 36, 38, and 40 between the substrate section 16 and outer film surfaces 31 and 33 of the film insert 14. In an exemplary embodiment, the film insert 14 and the substrate section 16 are cooperatively configured such that during airbag deployment, the film insert 14 is secured to the inboard portion 34 of the substrate section 16 along the interfaces 36, 38, and 40 while the portion of the insert quasi-knit line 29 that is disposed along the interfaces 30 and 32 function as the frangible tear seam 28 that ruptures. Advantageously, in an exemplary embodiment, this allows the inboard portion 34 of the substrate section 16 to cleanly detach (e.g., with minimal or no fragmentation) from an outboard portion 42 and to move in a direction (indicated by single headed arrow 44) as the integrated airbag deployment door 18, which is being urged to an open position by a deploying airbag, hereby forming an opening 46 in the substrate 12 to allow the airbag to advance through the substrate 12. In an alternative embodiment and as will be discussed in further detail below, the film insert 14 and the substrate section 16 are cooperatively configured such that during airbag deployment, the film insert 14 is secured to the outboard portion 42 of the substrate section 16 along the interfaces 30, 32, and 36 while the portion of the insert quasi-knit line 29 that is disposed along the interfaces 38 and 40 functions as the frangible tear seam 28 that ruptures.

Figure 3:
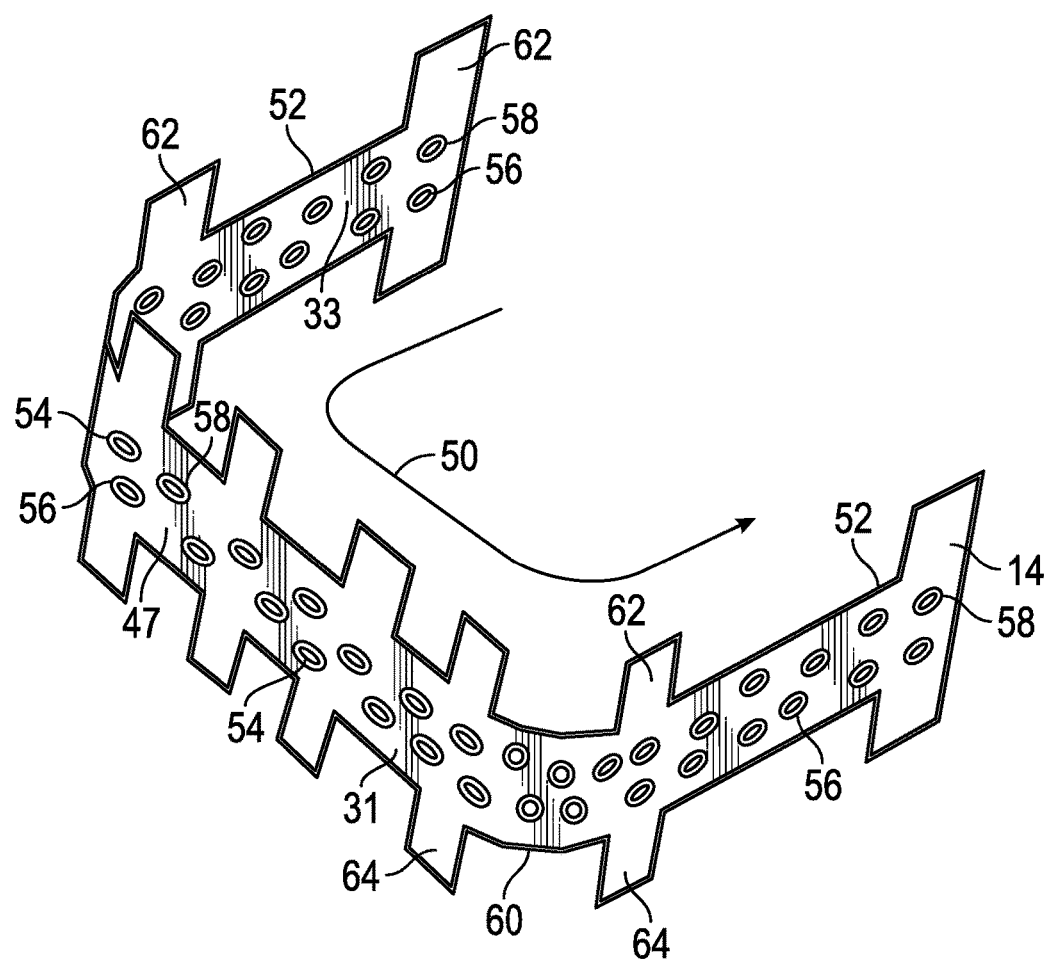
FIG. 3 is a perspective view of a film insert in accordance with an exemplary embodiment.

Referring to FIGS. 2-3, the film insert 14 comprises a tear seam-defining film portion 47 that has a film cross-section 48 (see FIG. 2) extending from about the inner surface 24 towards the outer surface 22 of the substrate 12. The film cross-section 48 may be configured as a constant or non-variable cross-section, or alternatively, as a variable cross-section. In an exemplary embodiment, the film insert 14 is an elongated film insert (e.g., extending longitudinally) and the tear seam-defining film portion 47 is defined by projection of the film cross-section 48 along a door flap shape-defining direction (indicated by variable direction arrow 50 shown in FIG. 3). In an exemplary embodiment, the door flap shape-defining direction 50 is configured to define a substantially U-shaped integrated airbag deployment door as illustrated in FIG. 1. Alternatively, the door flap shape-defining direction 50 may be configured to define a differently shaped integrated airbag deployment door arrangement, such as, for example, a substantially H-shaped bi-partitioning integrated airbag deployment door arrangement or the like.

As illustrated, the tear seam-defining film portion 47 (e.g., see also film cross-section 48) has the outer film surface 31, an edge 52 (e.g., upper edge), and the outer film surface 33 that interface with the substrate section 16, thereby defining the interfaces 30, 32, 36, 38, and 40, respectively. In an exemplary embodiment, the tear seam-defining film portion 47 has a plurality of holes 54 formed therethrough extending from the outer film surface 31 to the outer film surface 33. In an exemplary embodiment, the polymeric material (e.g., substrate material) of the substrate section 16 extends through the holes 54 to locally connect the integrated airbag deployment door 18 (e.g., inboard portion 34) with the outboard portion 42 of the substrate section 16. Advantageously, in an exemplary embodiment, locally connecting the integrated airbag deployment door 18 with the substrate material to the outboard portion 42 of the substrate section 16 allows the integrated airbag deployment door 18 to be sufficiently secured to the outboard portion 42 so as to withstand varying amounts of abuse loads (e.g. impact loads) while still allowing the inboard portion 34 to cleanly detach from an outboard portion 42 during airbag deployment. In an exemplary embodiment, the holes 54 have a diameter of from about 0.1 to about 2 mm, and independently, are spaced apart from each other a distance of from about 0.25 to about 2 mm. In an exemplary embodiment, the holes 54 are arranged in rows 56 and 58 that extend longitudinally along the tear seam-defining film portion 47. In one example, the holes 54 in row 58 are staggered relative to the holes 54 in row 56. Advantageously, in an exemplary embodiment, the diameter(s), spacing, and staggering of the holes 54 facilitates locally connecting the integrated airbag deployment door 18 to the outboard portion 42 with the substrate material in order to balance the robustness of the integrated airbag deployment door 18 against varying amounts of abuse loads with desirable deployment characteristics during airbag deployment.

As illustrated, the edge 52 of the tear seam-defining film portion 47 is spaced apart from the outer surface 22 of the substrate 12 while edge 60 is substantially flush with the inner surface 24 of the substrate 12. In an exemplary embodiment, the edge 52 is spaced apart from the outer surface 22 of the substrate a distance of from about 0.25 to about 1.5 mm, for example from about 0.25 to about 0.75 mm, to further help secure the integrated airbag deployment door 18 to the outboard portion 42 of the substrate section 16 for withstanding varying amounts of abuse loads. Advantageously, the edge 60 of the tear seam-defining film portion 47 is substantially flush with the inner surface 24 of the substrate 12 to help allow the integrated airbag deployment door 18 to cleanly detach from the outboard portion 42 of the substrate section 16 during airbag deployment.

In an exemplary embodiment, the tear seam-defining film portion 47 has a plurality of tabs 62 and 64 extending from the edges 52 and 60, respectively. As will be discussed in further detail below, the tabs 62 and 64 facilitate placing the film insert 14 into an insert molding tool for fabricating the substrate 12. As illustrated, at least a portion of the tabs 62 and/or 64 may be partially or fully trimmed to be flush with the outer surface 22 and/or the inner surface 24 of the substrate 12. Advantageously, in an exemplary embodiment, the tabs 62 and 64 are spaced apart from each other a distance of from about 15 to about 30 mm to facilitate positioning the film insert 14 during fabrication of the substrate 12.

As illustrated in FIG. 2, the chute 20 may be positioned against the inner surface 24 of the substrate 12 just laterally adjacent to the tear seam-defining film portion 47 such that the corner 66 of the chute 20 is proximate (e.g., directly under) the interface 30 to facilitate the integrated airbag deployment door 18 detaching from the outboard portion 42 along the interfaces 30 and 32. In this embodiment, the frangible tear seam 28 is formed along the outer film surface 31 that faces away from the integrated airbag deployment door 18. In an alternative embodiment, the chute 20 may be positioned (indicated by dashed lines 68) against the inner surface 24 of the substrate 12 directly under the tear seam-defining film portion 47 such that the corner 66 of the chute 20 is proximate (e.g., directly under) the interface 40 to facilitate the integrated airbag deployment door 18 detaching from the outboard portion 42 along the interfaces 38 and 40. In this embodiment, the frangible tear seam 28 is formed along the outer film surface 33 that faces toward the integrated airbag deployment door 18.

Figure 4:
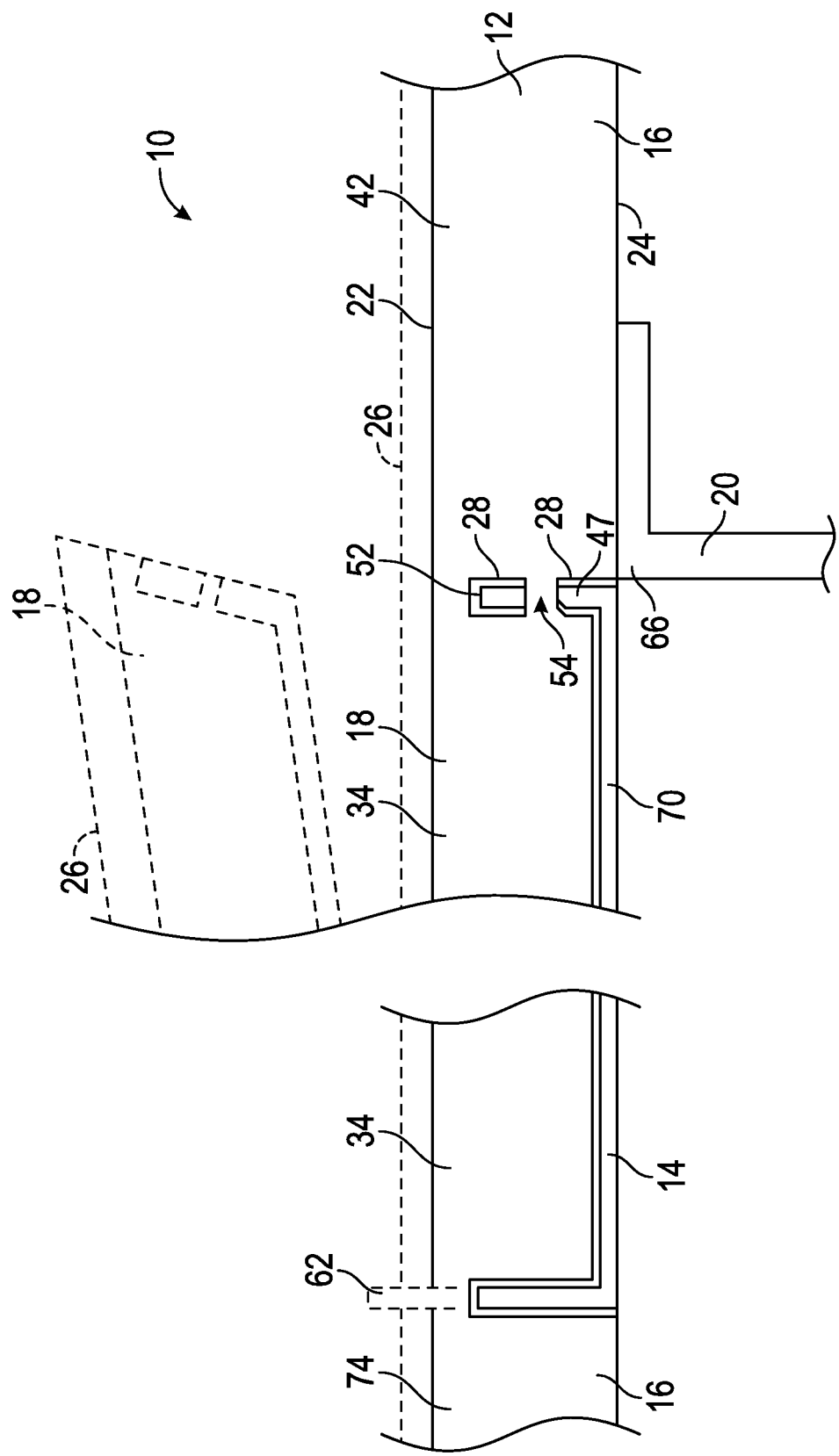
FIG. 4 is a sectional view of the interior panel depicted in FIG. 1 along line 2-2 in accordance with another exemplary embodiment.
Figure 5:
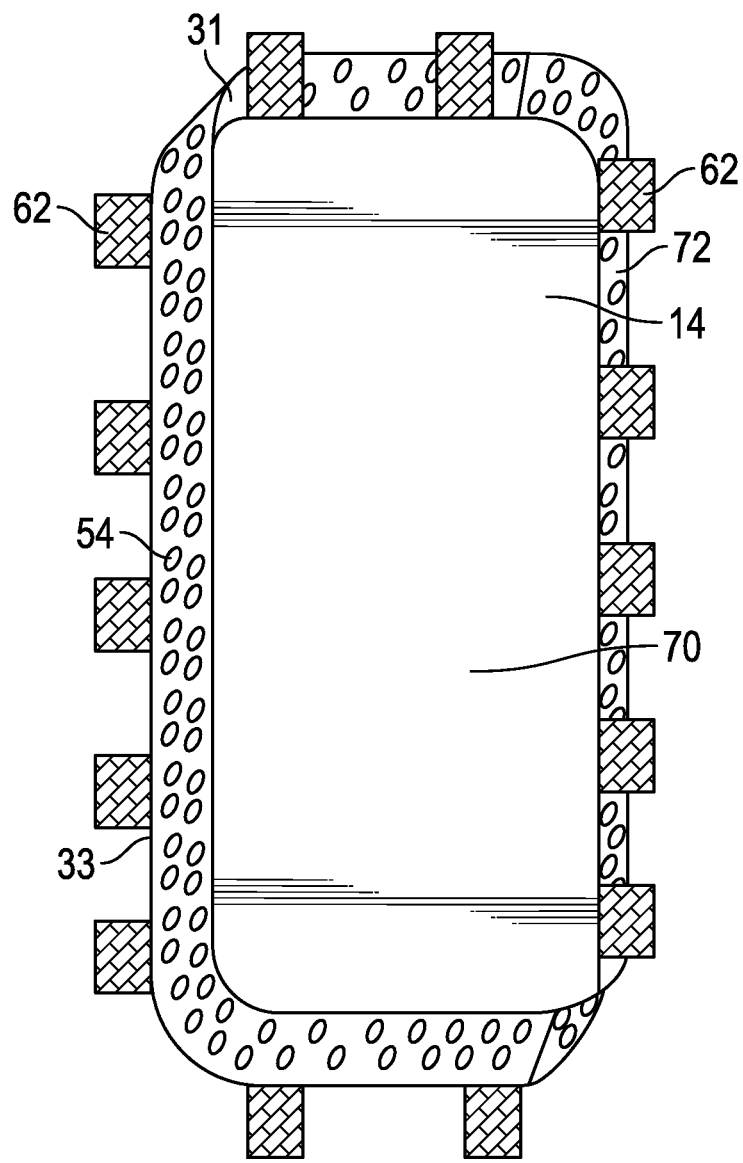
FIG. 5 is a perspective view of a film insert in accordance with an exemplary embodiment.
Figure 6:
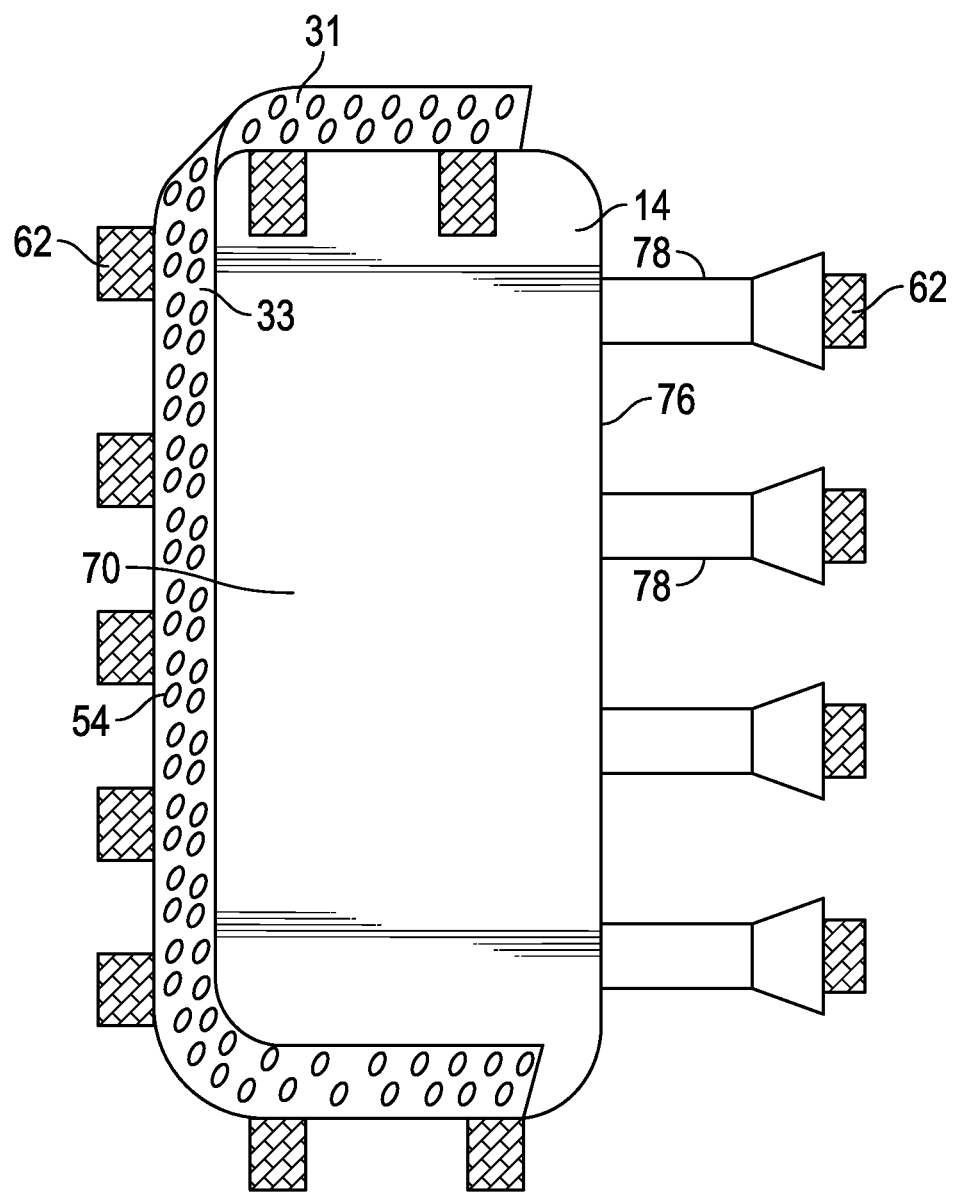
FIG. 6 is a perspective view of a film insert in accordance with an exemplary embodiment.

FIG. 4 is a sectional view of the interior panel 10 depicted in FIG. 1 along line 2-2 utilizing the film insert 14 as illustrated in FIG. 5 or, alternatively, as illustrated in FIG. 6 in accordance with various embodiments. Referring to FIGS. 4-5, in an exemplary embodiment, the film insert 14 comprises a door body portion 70 that extends laterally from the tear seam-defining film portion 47 substantially across the integrated airbag deployment door 18. In one example, the door body portion 70 is disposed along the inner surface 24 of the substrate 12 along the integrated airbag deployment door 18. As illustrated in FIG. 5, in an exemplary embodiment, the tear seam-defining film portion 47 completely surrounds the door body portion 70 in which a forward section 72 of the tear seam-defining film portion 47 is sized (e.g., height) such that a hinge portion 74 is defined in the substrate section 16. In particular, during airbag deployment, the integrated airbag deployment door 18 opens pivoting about the hinge portion 74.

Alternatively and as illustrated in FIG. 6, the tear seam-defining film portion 47 may only partially surround the door body portion 70 such that the door body portion 70 has a forward edge 76. In an exemplary embodiment, the film insert 14 has dovetail features 78 extending from the forward edge 76 and tabs 62 that extend from the dovetail features 78. Advantageously, the film inserts 14 as illustrated in FIGS. 5-6, which include the door body portion 70 with additional tabs 62 along either the forward section 72 or the dovetail features 78, provide alternative configurations that facilitate positioning the film insert 14 in an insert molding tool for fabricating the substrate 12 as will be discussed in further detail below.

Figure 7:
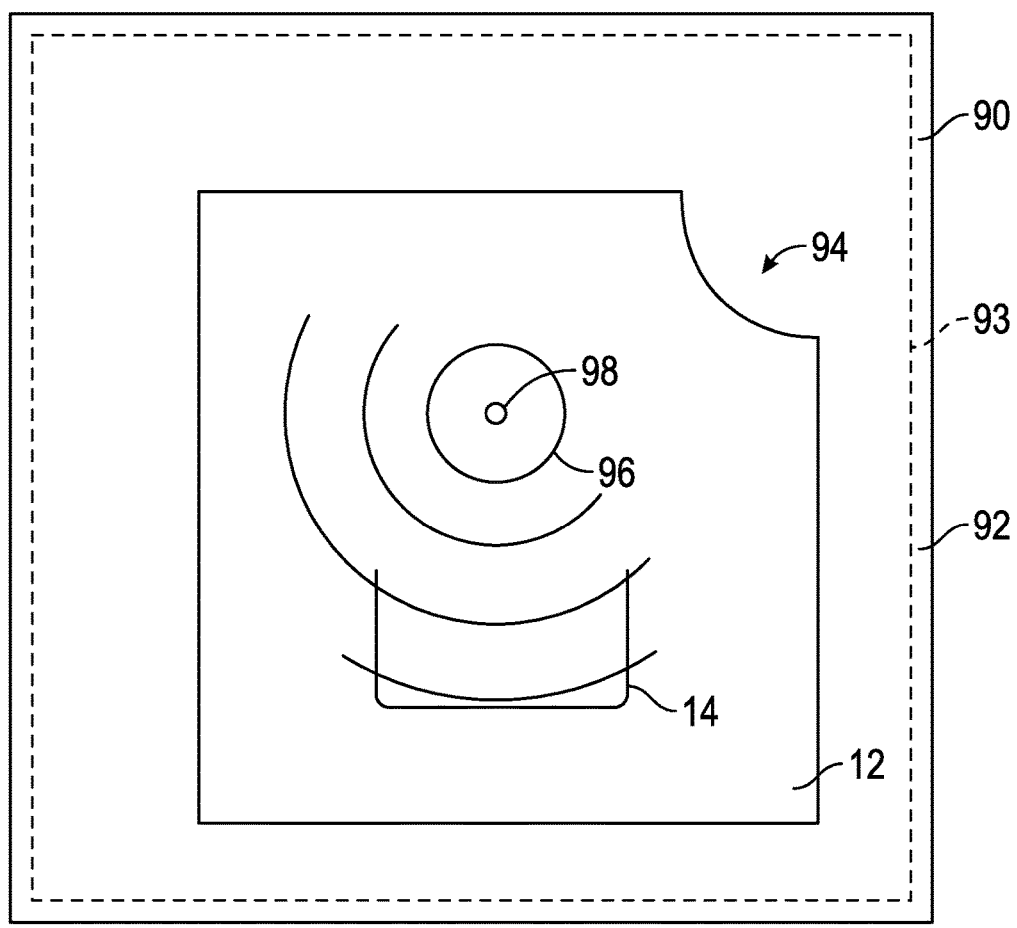
FIG. 7 is a top view of an interior panel in a molding tool and a method for making an interior panel for a motor vehicle in accordance with an exemplary embodiment.

FIG. 7 is a top view of a molding tool 90 for fabricating the substrate 12 in accordance with an exemplary embodiment. The molding tool 90 includes molding tool portions 92 and 93 that may be moved relative to each other during an insert molding process, such as, for example, an insert injection molding process as is well-known in the art. The molding tool portions 92 and 93 are a match die set and define a molding tool cavity 94 when the molding tool portions 92 and 93 are positioned in contact with each other in the closed mold configuration.

Figure 8:
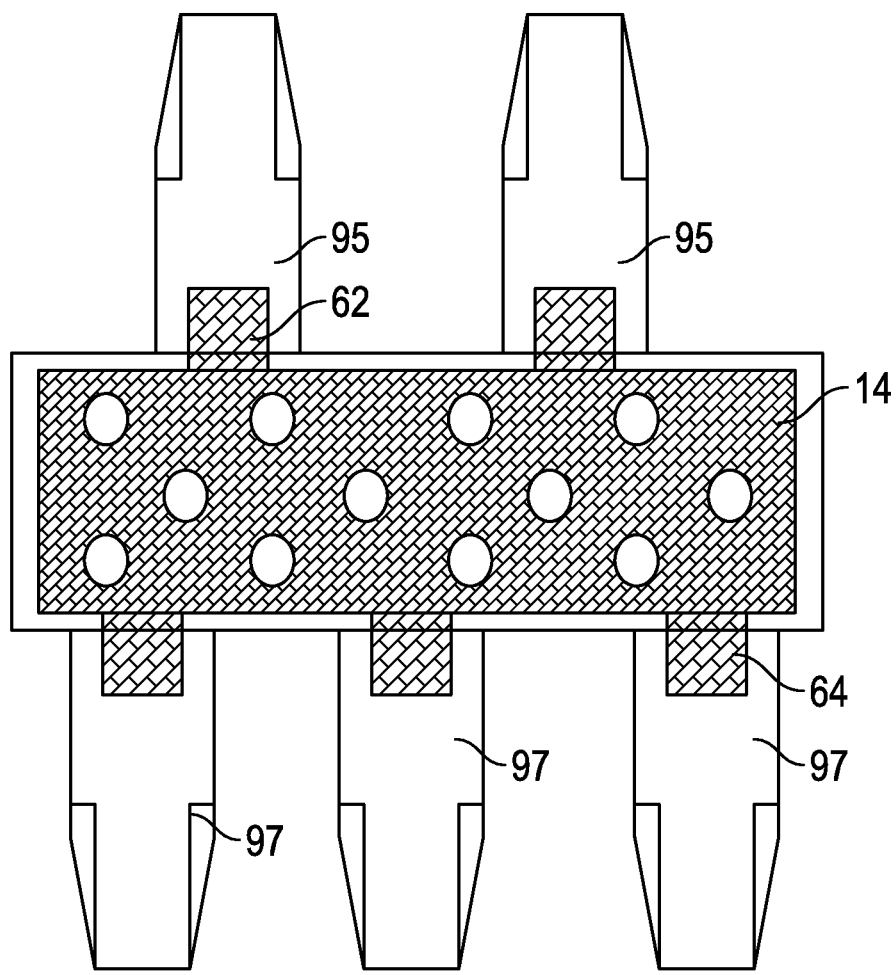
FIG. 8 is a front view of a film insert of an interior panel in a molding tool in accordance with an exemplary embodiment.

Referring to FIGS. 7-8, the molding tool 90 contains a film insert 14 that is positioned in the molding tool cavity with grippers 95 and 97. In an exemplary embodiment, the grippers 95 and 97 extend from molding tool portions 92 and 93 when the molding tool 90 is in an opened mold configuration. As such, the tabs 62 and 64 of the film insert 14 are positioned in and retained by the grippers 95 and 97, respectively. Once the film insert 14 is retained by the grippers 95 and 97, the molding tool portions 92 and 93 move relative to each other to the closed molding configuration where the grippers 95 and 97 retracted into their respective molding tool portions 92 and 93 such that the film insert 14 is oriented as desired in the molding tool cavity 94.

During an injection cycle of the insert molding process, a molten plastic material 96 is advanced through one or more gates 98 into the molding tool cavity 94. In an exemplary embodiment, the molten plastic material 96 is a plastic material as discussed above in a molten state. In an exemplary embodiment, the molten plastic material 96 has a temperature of from about 150 to about 310° C.

The molten plastic material 96 advances through the molding tool cavity 94 and contacts the film insert 14 to form the insert quasi-knit line 29 along the interfaces 30, 32, 36, 38, and 40 (shown in FIG. 2) of the film insert 14 as discussed above. In an exemplary embodiment, the film insert 14 is cooler than the molten plastic material 96 and has a temperature of from about 15 to about 50° C. to advantageously help form the insert quasi-knit line 29 (shown in FIG. 2) as weakened lines or interfaces. Additionally, the molten plastic material 96 substantially fills the molding tool cavity 94 for "packing out" the cavity 94.

The process continues by solidifying the molten plastic material 96 to form the substrate 12. In an exemplary embodiment, the molten plastic material 96 is cooled in the molding tool 90, for example, to a temperature of about 50° C. or less (e.g., from about 15 to about 50° C.) to solidify the molten plastic material 96 as is well-known in the art. The molding tool portions 92 and 9'3 are moved apart and the substrate 12 is removed from the molding tool 90 using, for example, "end of arm tooling".

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An interior panel for a motor vehicle comprising:
    a substrate, wherein the substrate comprises:
        a substrate section; and
        a film insert disposed in the substrate section, the film insert comprises a tear seam-defining film portion that extends longitudinally along a door flap shape-defining direction and that is defined by projection of an optionally variable film cross-section along the door flap shape-defining direction, the tear seam-defining film portion has a first outer film surface and a plurality of holes formed therethrough; and
        a frangible tear seam formed along an interface defined between the first outer film surface of the film insert and the substrate section defining an integrated airbag deployment door in the substrate.

2. The interior panel of claim 1, wherein the integrated airbag deployment door comprises at least a portion of the film insert.

3. The interior panel of claim 1, wherein the substrate has an outer surface and an inner surface that is opposite the outer surface, and wherein the first outer film surface extends along the interface from about the inner surface towards the outer surface of the substrate.

4. The interior panel of claim 3, wherein the first outer film surface faces towards the integrated airbag deployment door.

5. The interior panel of claim 3, wherein the first outer film surface faces away from the integrated airbag deployment door.

6. The interior panel of claim 1, wherein the tear seam-defining film portion separates the integrated airbag deployment door from a remaining portion of the substrate section, and wherein the substrate section has substrate material extending through the holes correspondingly locally connecting the integrated airbag deployment door with the remaining portion of the substrate section.

7. The interior panel of claim 6, wherein each of the holes have a diameter of from about 0.1 to about 2 mm.

8. The interior panel of claim 6, wherein the holes are spaced apart from each other a distance of from about 0.25 to about 2 mm.

9. The interior panel of claim 6, wherein the holes are arranged in a plurality of rows including a first row and a second row, and wherein the holes in the first row are staggered relative to the holes in the second row.

10. The interior panel of claim 3, wherein the film insert comprises a door body portion that extends laterally from the tear seam-defining film portion substantially across the integrated airbag deployment door.

11. The interior panel of claim 10, wherein the door body portion is disposed along the inner surface of the substrate.

12. The interior panel of claim 1, wherein the door flap shape-defining direction is configured to define a substantially U-shaped integrated airbag deployment door.

13. An interior panel for a motor vehicle comprising:
a substrate, wherein the substrate comprises:
   a substrate section; and
   a film insert disposed in the substrate section such that a frangible tear seam is formed along an interface between the film insert and the substrate section defining an integrated airbag deployment door in the substrate,
wherein the substrate has an outer surface and an inner surface that is opposite the outer surface, wherein the film insert comprises a tear seam-defining film portion that extends longitudinally along a door flap shape-defining direction and that is defined by projection of an optionally variable film cross-section along the door flap shape-defining direction, wherein the optionally variable film cross-section has a first outer film surface that extends along the interface from about the inner surface towards the first outer film surface of the substrate,
wherein the tear seam-defining film portion has an edge extending longitudinally along the door flap shape-defining direction, and wherein the film insert comprises a plurality of tabs that are spaced apart from each other and that extend outwardly from the edge of the tear seam-defining film portion.

14. The interior panel of claim 13, wherein the tabs are spaced apart from each other a distance of from about 15 to about 30 mm.

15. A method of making an interior panel for a motor vehicle, the method comprising the steps of:
providing a film insert that comprises a tear seam-defining film portion that extends longitudinally along a door flap shape-defining direction and that is defined by projection of an optionally variable film cross-section along the door flap shape-defining direction, the tear seam-defining film portion has a first outer film surface and a plurality of holes formed therethrough; and
insert molding a substrate comprising:
   positioning the film insert in a molding tool; and
   advancing and solidifying a molten plastic material in the molding tool to form a substrate section about the film insert such that an insert quasi-knit line is formed along an interface defined between the first outer film surface of the film insert and the substrate section, wherein at least a portion of the insert quasi-knit line defines a frangible tear seam that defines an integrated airbag deployment door in the substrate.

* * * * *